United States Patent [19]

Solomon et al.

[11] Patent Number: 4,687,553
[45] Date of Patent: Aug. 18, 1987

[54] UNITIZED ELECTRODE-INTERCELL CONNECTOR MODULE

[75] Inventors: Frank Solomon, Great Neck, N.Y.; Charles Grun, Matawan, N.J.; Donald W. Abrahamson, Painesville, Ohio; James J. Stewart, Chardon, Ohio; Marilyn J. Niksa, Concord, Ohio

[73] Assignee: Eltech Systems Corporation, Boca Raton, Fla.

[21] Appl. No.: 739,184

[22] Filed: May 30, 1985

[51] Int. Cl.$^4$ .............................................. C25D 5/02
[52] U.S. Cl. ...................................... 204/16; 204/24; 204/37.1
[58] Field of Search ................. 204/11, 24, 37.1, 38.5, 204/16

[56] References Cited

U.S. PATENT DOCUMENTS

| | | | |
|---|---|---|---|
| 1,243,654 | 10/1917 | Clark | 204/24 |
| 3,407,125 | 10/1968 | Fehlner | 204/20 |
| 3,488,220 | 1/1970 | Lyall et al. | 136/10 |
| 3,549,505 | 1/1967 | Hanusa | 204/11 |
| 3,694,325 | 9/1972 | Katz et al. | 204/11 |
| 4,077,853 | 3/1978 | Coll-Palagos | 204/20 |
| 4,091,184 | 5/1978 | Erisman et al. | 429/139 |
| 4,251,603 | 2/1981 | Matsumoto et al. | 429/94 |
| 4,421,609 | 12/1983 | Gerard | 204/24 |
| 4,436,601 | 3/1984 | Branchick et al. | 204/149 |

FOREIGN PATENT DOCUMENTS 0071119  2/1983  European Pat. Off. ............. 204/24

OTHER PUBLICATIONS

Modern Electroplating, edited by F. S. Lowenheim (third edition), 1974, Table 1 at pp. 314–315.
Monthly Review American Electroplaters Society, Mar. 1945, vol. 32, pp. 227–234.
386,934 filed 6/82 (U.S. Patent Application).

Primary Examiner—T. M. Tufariello
Attorney, Agent, or Firm—John J. Freer

[57] ABSTRACT

A unitized electrode-intercell connector module is prepared for use in a bipolar electrode, especially for use in such electrode of the M-alkaline electrolyte-AgO types. In such special electrode, an imperforate foil, contacted with a conductive foam, is plated to a unitized, electrobonded assembly. Pyrolysis can lighten the assembly and may further provide for subsequent resistance to attack in an electrode environment. For the special electrode the reticulate portion of the assembly can be filled to provide an AgO electrode and the bipolar electrode completed by using a suitable electronegative metal on the foil side opposite from the AgO electrode.

25 Claims, 1 Drawing Figure

UNITIZED ELECTRODE-INTERCELL CONNECTOR MODULE

BACKGROUND OF THE INVENTION

Battery electrodes may be made of sintered metal powder and may have sintered metal base with an active material filled into the micropores, such as discussed in U.S. Pat. No. 3,488,220. Or the sintered metal may itself be the electrode active material. It has also been disclosed to form a porous electrode matrix by sintering, with the electrode then being attached to a base plate. In U.S. Pat. No. 4,091,184, it is disclosed to deposit silver oxide onto an intercell connector to form a porous matrix of silver oxide which is then dried, sintered, pressed and recharged to form a positive electrode.

Another technology relying on a porous matrix and eventually leading to battery electrode development, while ostensibly having at least partial prior art origins in U.S. Pat. No. 3,549,505, was developed from metallized foams. In this '505 patent a reticulated polyurethane foam having interconnected cells is coated with a conductive material followed by electroplating. Optionally, pyrolysis can follow the elctroplating to decompose the underlying polyurethane skeleton. Directly stemming from this as a general development, a metallizing method improvement was disclosed in U.S. Pat. No. 4,077,853. As discussed therein, after the nickel-electroplating step, the material was pyrolyzed under a hydrogen reducing atmosphere resulting in a ductile metallized foam. This material was discussed in the '853 patent as being useful for battery plates. In a corollary general development, taught in U.S. Pat. No. 3,694,325 for preparing materials that might be useful as electrodes, it was disclosed to subject the metallized foam after the nickel plate to a first heating step at 800° F. (427° C.) in an oxidizing environment and subsequently to anneal the metal in a reducing atmosphere at a temperature of at least about 1400° F. (760° C.)

Referring still to such technology, but as tailored more particularly to battery electrode application, developments include techniques as have been disclosed in European Patent Application No. 071,119. The process disclosed therein involves temperatures of essentially ambient to only slightly above ambient. In this development, nickel oxide is impregnated in the nickel plated open cell material and subsequently compressed in electrode preparation.

Referring still to battery electrode preparation, but in a development involving pyrolysis, a resin impregnated with carbon to aid coating ease, after electroplating, is next roasted for resin removal. It is then annealed in a reducing environment, all as taught in U S. Pat. No. 4,251,603. Thereafter, a paste of nickel hydroxide can be used for filling the porous nickel structure thus prepared.

There is, nevertheless, a need for preparing battery components which can be high in active material utilization. This aspect of desirable utilization should be coupled with ruggedness of structure, permitting augmented charge-discharge cycles without deleterious loss of structural integrity. Such combination would be most desirable for providing multiple uses of the electrode.

SUMMARY OF THE INVENTION

A method has now been found for preparing a battery electrode in combination with an intercell connector which achieves a desirable ruggedness of structure, such as needed in handling and during usage. Moreover, a highly desirable active material utilization percentage is achieved. Many charge-discharge cycles can be obtained without deleterious loss of structural integrity. Moreover, desirable plating and bonding technology has now been developed to accomodate electrode development.

In a most important aspect, the present invention is directed to the method of producing a unitized electrode-intercell connector module of a bipolar electrode, which is particularly adapted for use in such of the M alkaline electrolyte-AgO types, wherein M represents a suitable electronegative metal. More particularly the method comprises first contacting an imperforate metal foil intercell connector with a metal platable plastic foam having interconnected pores, then electroplating the resulting foil-foam combination, bonding same together into a unitized combination having metal plate on the foam, thereby establishing the plate as a reticulate metal plate, which plate is electrobonded by the electroplating to the imperforate metal foil. This is followed by pyrolyzing the resulting unitized combination, thereby removing plastic foam underlying the reticulate metal plate. Next the method comprises establishing a silver active material in the interstices of the reticulate metal plate whereby the plate is loaded with silver filling, and then, sintering the silver of the loaded reticulate metal plate, thereby forming such electrode intercell connector module for a bipolar electrode.

In other aspects, the invention is generally directed to a unitized electrode-intercell connector module and to a bipolar electrode containing same. The invention is more particularly directed to a battery comprised of such electrode. In yet another aspect, the present invention includes a special step wise method for providing a reticulate metal structure, remaining from the pyrolysis of a metallized polymer foam skelton, with such reticulate metal structure being particularly well adapted for battery construction and resistance to the environment of same.

Still further aspects of the present invention include a method of electrobonding a metal platable plastic foam to a metal sheet, as well as the aspect of an innovative electrode containing a plate and foam combination and especially adapted for use in an electrolysis cell for preparing the foam electrobonded to the sheet. A yet further aspect of the present invention is directed to a novel nickel-containing electrolyte solution for electrobonding conductive foam to conductive metal.

DESCRIPTION OF THE PREFERRED EMBODIMENTS

Figure 1:
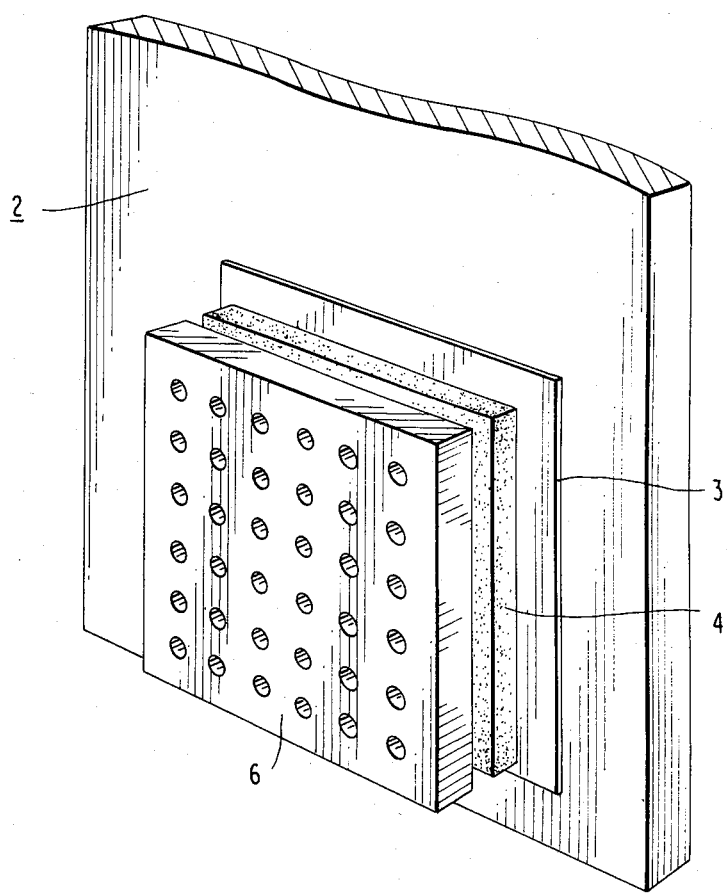
FIG. 1 is an exploded view of an electrode having a conductor plate in partial section, and foam plus foil in face-to-face relationship for electrobonding such combination.

A plastic material with characteristic filiform open cell morphology, with filaments which can be metal coated, is often referred to herein simply as plastic "foam", for convenience. It must necessarily have interconnected pores to permit eventual penetration of metal through to the foil intercell connector. The useful plastic foam substrate employed can be any of those which find use for metal coating, such as polyurethanes, including the polyether urethane foams and polyester urethane foams, polyesters, olefin polymers, i.e., polypropylene or polyethylene, vinyl polymers and polyamides. The foam substrate usually comprises a plurality of filaments or fibrids, interconnected to provide interconnected pores. The foam can be made conductive by conventional plate techniques or by impregnation. For autocatalytic plating techniques, the foam is typically first prepared by a sensitizing treatment and then a catalyzing treatment. It is thereby rendered receptive for deposition of an electroless metal plating, which technique has been discussed for example in U.S. Pat. No. 4,436,601. Subsequent plating can be typically performed as an electroless metal plating, e.g., an electroless copper plating or an electroless nickel plating. The resulting conductive foam is thereby prepared for electroplating.

It is however, preferred for economy that the foam substrate be rendered conductive for electroplating by coating with a conductive substance. Preferably for efficient electroplating, the foam substrate will thus contain carbon. A particularly advantageous, conductive reticulate plastic material with appropriate filiform morphology is an open cell polyurethane foam of greater than 90 percent porosity, e.g., about 95 percent, which is preferred, and having from about 10 pores per inch to about 100 pores per inch, the pores ranging from about 2 millimeters to about 0.15 millimeter in diameter. For best structural integrity during filling, e.g., with powdered metal, as well as in subsequent use, a range of from about 20 pores per inch to about 50 pores per inch is most advantageous.

The coated foam, or the prepared foam from electroless plating, is then suitable for electroplating. But first a selected foam unit is placed in firm face-to-face contact with an imperforate metal foil (intercell connector). It is to be understood that for some applications such as other than the most desirable battery electrode use, the imperforate metal may be in a sheet form, i.e., generally planar and thicker shape other than foil. But referring again to the preferred foil form, for providing firm contact, it has been known to embed metal articles in a foam, heated to its melting point for pliability. For example, a metal current distributor, heated to a temperature above the melting temperature of the foam, can be immersed in the foam, as taught in copending U.S. Pat. No. 4,615,784. However, such immersion techniques are not suitable for use herein as the foam foil combination must have broad interfacial contact for the foil to serve as the intercell connector. Moreover, for use herein the foil should readily release from the plating current distributor and heating of the foil can cause melting of the foam and obstruction of an openly porous plastic, especially at the point of contact between foam and foil. Thus, a non-elevated temperature, non-embedded, face-to-face contact is used.

In an especially preferred arrangement, and referring now more particularly to FIG. 1, a unit of the foil 3 is placed against an underlying metal support plate 2 which can not only be used for supporting the foil 3 placed flat against the plate 2 but also can be used as a current distributor to the foil 3. On the face of the foil 3 opposite the support plate 2, the foam 4 prepared for electroplating is applied. The foam 4 can be firmly pressed against the foil 3, as by using a non-conductive perforate overlay member 6, e.g., formed from a suitable non-conductive plastic such as polyvinyl chloride. By means of such pressure technique, the foil 3 is likewise firmly pressed against the support plate 2, for good electrical contact. Upon dismantling, the foil 3 will readily release from the support plate 2. In assembly, this combination of foil 3 and foam 4, in further combination with the support plate 3 can then form an electrode for contact with a suitable electroplating solution. This will include the use of means, not shown, for electrically energizing the plate 2. It is to be understood that although such arrangement of the figure is especially useful for plating a foil foam combination, it is contemplated to use such arrangement in other combinations wherein foam is to be electrobonded to a plate surface.

The imperforate metal foil 3 (intercell connector) can be a metallic nickel foil 3. However, other metals can be used, e.g., stainless steel as well as silver and copper, and these other metals can include alloys and mixtures, including nickel alloys and intermetallic mixtures containing nickel. Moreover, clad metal foils 3, can be particularly desirable. For example, one useful clad metal foil 3 can be a silver-nickel clad foil 3 having a nickel face and a silver face. Or the metal foil 3 can be pretreated, e.g., as by electroplating in a nickel strike bath, prior to contacting with the foam 4.

The electroplating of the foam 4 to the foil 3 can be conducted by electroplating as with copper, nickel, cadmium or zinc. As the plating will be useful for providing a strongly adhering, electrobonded foam-foil (4,3) module, the plating selection is most often chosen with electrobond strength in mind. For such bond strength and economy, a nickel electroplate is preferred. Combinations of electroplate may also be serviceable. For example, a copper flash electroplate may precede nickel plating, or a gold electroplate may precede a final silver plate. The entire foam foil (4,3) module may be electroplated, although it is essential that only the foam 4 and the face of the foil 3 in contact with the foam 4 receive such plate.

Although it is to be understood from the foregoing that a variety of metal combinations are contemplated, and these include various combinations serviceable for use as battery electrodes, it is of particular interest herein to manufacture a silver electrode for the combination module. For this reason, reference will generally be made hereinafter to this particular application. In this application, it is necessary that the last electroplate procedure in any sequence be silver plating in manufacturing the silver oxide electrode. Silver plating prepares the foam for its eventual utility, but silver plating alone will not provide the necessary strong electrobonded foil-foam unit. For economy. the silver plating is most always limited to the foam and the face of the foil in contact with the foam, e.g., as by masking other foil surfaces before plating.

For general considerations regarding the initial electrolytic plating, it is contemplated to use a metal plating bath such as any copper, nickel, cadmium or zinc plating bath, with baths such as for cadmium and zinc being undesirable for the preferred silver electrode because cadmium and zinc will react chemically with the silver electrode. If the bath is chemically agressive so as to potentially deleteriously affect the plastic foam, it is advantageous to apply a foam having an electroless plate so as not to undesirably disturb such integrity of the foam during the electroplating operation. For the special case of preparing a foam-foil combination relying on a carbonized foam, and especially for preparing a battery using a silver electrode, it is preferred to use a special, concentrated nickel electroplating bath.

Preferably, for best adhesion of the carbonized foam to the foil, coupled with uniform nickel plating of the foam, this special bath will have an electrolyte containing above about 250 grams per liter, and more usually above about 275 grams per liter, of nickel chloride hexahydrate ($NiCl_2 \cdot 6H_2O$). At the same time, the electrolyte will likewise contain above about 250 grams per liter, and more usually above about 275 grams per liter, of nickel sulfate hexahydrate ($NiSO_4 \cdot 6H_2O$). More typically, the concentration of each of these ingredients will be between about 290-310 grams per liter of electrolyte, although it is contemplated that they each be present in solution up to saturation. In a specially preferred fresh bath for enhanced foam-foil combination electrobonding there will be egual 300 grams per liter amounts of both the nickel chloride hexahydrate and the nickel sulfate hexahydrate. In addition to these ingredients, this bath will contain buffering agent, e.g., boric acid. Generally, there will be present from about 20 grams per liter to about 50 grams per liter of such buffering agent. Usually for best plating efficiency this bath will be maintained at a pH within the range of from about 4 to 5. For required pH adjustment, as can accompany an on-going plating operation, in addition to the replenishment of one or more of the principal nickel constituents, it can also be desirable to effect pH adjustment by means of addition of buffering agent or other adjusting agent, e.g., sulfuric acid or hydrochloric acid, or both buffering agent and other agent. It is to be understood that additional substituents may be present in the bath and these can include sodium lauryl sulfate or hydrogen peroxide to prevent hydrogen pitting.

The initial electrolytic plating can then be followed by pyrolysis, which is more fully described hereinbelow. It is to be understood, however, that if a plastic resistant to the electrode environment has been selected, the pyrolysis step may be obviated. For example, the use of a plastic resistant to strong alkali, and thus not such a plastic as polyurethane, may find use in silver electrode manufacturing, without pyrolysis processing. Pyrolysis, following an electroplating step, and usually following the last electroplating step, will otherwise be employed.

For the preferred silver electrode manufacture on carbonized polyurethane foam, the initial electrolytic plating will most always be followed by the silver plating. It is contemplated that any silver electroplating composition for use in a silver electroplating operation will be useful in the present invention. However, for efficiency in electroplating, it is advantageous to select a silver electroplating solution of enhanced throwing power. It is not necessary that any of the electrolytically applied plate be uniform and crack free. Rather, it is desirable that each plate be slightly imperfect, i.e., discontinuous, thereby leaving exposed cracks to substrate plastic or exposed filiform plastic ends.

The plated foil-foam module containing the metallized foam is then ready for pyrolytic treatment, unless such has been accomplished after the nickel plating as mentioned hereinbefore. The pyrolysis will desirably reduce the weight of the module as well as providing for removal of plastic material which might be chemically attacked in the bipolar electrode environment of the module. The heat treatment should however, not be so severe as to disrupt the plating. To avoid this, it is most desirable that the heating be conducted in a stepwise fashion. This step wise pyrolysis involves not only a change in temperature but also a change in pyrolysis environment. For most efficient pyrolysis, it is preferred that the initial step include an elevated temperature heat treatment. This heat treatment is typically conducted at a temperature within the range of from about 500° C. to about 700° C. for a time of about 0.5 to 3 hours. Preferably this initial pyrolysis step is conducted at a temperature within the range of from about 625°-675° C. for a time of about 1.5 to about 2.5 hours. A reducing atmosphere is used. Although it is contemplated to employ any reducing atmosphere useful for such purpose, advantageously for efficient pyrolysis a combination of inert gas plus reducing gas will constitute the atmosphere The inert gas employed may be any such as argon, nitrogen, or their mixtures, and the reducing gas can be hydrogen, ammonia or their mixtures. The inert gas is usually present in major proportion to minimize the hydrogen combustion hazzard. Although a total atmosphere of reducing gas may be used, it is advantageous for retarding combustion that from about 2 to about 8 volume percent of the reducing atmosphere is actually reducing gas.

The second step of the pyrolysis treatment is at a more reduced temperature, e.g., it is conducted at a temperature within the range from about 350° C. to about 500° C. For further removal of the plastic foam, this step of the pyrolysis treatment takes place in a nonreducing atmosphere, and can simply be conducted in air. Moreover, this is a treatment step of short duration, on the order of only a few minutes up to about an hour with about 20 to 40 minutes being most typical. Advantageously for efficient treatment the temperature for this second step is between about 425°-475° C.

The last or third step of the treatment is also conducted at the reduced temperature of the second step, to remove surface oxides which may have formed on exposed metal surfaces during the second step. This last step is conducted in a reducing gas environment, which can be the same environment of the first step. In duration, it is the longest treatment, usually taking place from about 4 to about 20 hours. For economy an about 8 to 14 hour treatment is preferred. The step-wise treatment may be discrete steps, or may be conducted in a continuous mode, e.g., a lowering of oven temperature accompanied by a sweeping of air into the oven when progressing from the first to the second step. Usually about a total 5 to 10 percent reduction in weight will be accomplished with the plated module in the full, three step pyrolysis.

The resulting plated foil-foam module, with foam skeleton pyrolyzed, is then ready for filling the interstices of the resulting reticulate metal plate with active electrode material, e.g., battery active material. In the alternative method for the preferred silver electrode manufacture, this can be accomplished by impregnating the metallized reticulate portion with a silver salt solution, such as silver nitrate in water, and precipitating silver oxide from the solution into the reticulate. This method prepares the AgO electrode, from the metallized reticulate, for operation completing formation of the electrode-intercell connector module, such as subsequent sintering operation or pressing and sintering operation. The module is then ready for finishing as a bipolar module, which will be discussed more particularly hereinbelow.

Preferably however for this special silver electrode manufacture, for best active material utilization, a silver particulate is used. In this method, the silver particulate may be a dry particulate or the filling may be accomplished by wet method. The particulates can be in any finely divided, electrochemically effective form, e.g., flake or mixture of flake and powder, but preferably for economy and maximum effectiveness the particulate simply is a powder. Usually whether employing the particulate in the dry or wet method, a very finely divided material is used, such as one having average particle size of less than about ten microns. More typically, the particulate will have an average particle size of between about 1–10 microns, with essentially all particles finer than about 20 microns.

In the wet method, any suitable silver particulate slurry or paste may be used. Various application methods have been proposed, involving vibration, rubbing, suction and/or spray techniques or steps. One special method for applying a wet paste to a porous fibrous material has been shown for example in European Patent Application No. 126,160. For efficiency and economy of filling, it is preferred to employ a dry silver powder and to use simple addition of the powder to the metallized reticulate by means of pouring and then working the silver powder into such reticulate. It is desirable to work the powder layer back and forth, with a light force, during application. Usually after filling, the resulting filled metallized reticulate is pressed to a desired thickness. This may be typically conducted at a moderate pressure of from about 2 to about 6 kpsi. It is also contemplated to use combinations of filling techniques, e.g., a filling operation initiated with the addition of silver powder pressed into the foam followed by impregnating the resulting filled reticulate with silver salt solution which may precipitate additional material.

Following these procedures, a sintering step is used. With the preferred dry powder filling technique, such a sintering step will be most useful for interbonding silver particulates. It is to be understood that during the silver plating operation, the silver plate will also be present on plated and exposed filaments of the reticulate as well as on the exposed foil surfaces that have not been masked. Therefore in the sintering operation, electrobonding of silver may involve not only electrobonding of particulates to themselves, but also to the exposed, silver plated foil as well as to silver plated filament. The sintering operation is preferably conducted in a reducing atmosphere, such as one described hereinabove, to maintain the integrity of the foil as well as avoid oxidation of same. A moderate temperature, within the range of from about 300°–500° C. is usually employed, for a short time, such as a time as short as about 2 to 5 minutes, but which may be up to about one-half hour or more. Advantageously for economy, sintering at a temperature within the range of about 300°–400° C. for a time of about 10–30 minutes will be used.

Where there is need to convert silver to silver oxide in the resulting filled metallized reticulate to complete formation of the AgO electrode for the electrode-intercell connector module, an electrochemical conversion technique is contemplated, e.g., anodization in caustic electrolyte. It is preferred to maintain an overcharge over a theoretical 100% oxidation to silver oxide. Usually, a 10% to 50% overcharge will be employed, with an overcharge within the range from about 20% to about 40% being advantageous for efficiency and economy. Anodization can be conducted in a moderately strong alkaline solution, e.g., 25 to 45 weight percent potassium hydroxide, at room temperature or moderately elevated temperature. Following conversion, and usually several additional, conventional steps, e.g., washing and drying, the completed electrode-intercell connector module from this preferred method and containing the resulting silver active material is then ready for finishing as a bipolar electrode.

This finishing can be accomplished by merely applying a suitable negative battery electrode on the foil connector surface, which surface is reverse of the silver oxide battery electrode. Any suitable electronegative metal, to prepare a bipolar electrode of the M-alkaline electrolyte-AgO type, where M represents the electronegative metal, will be useful. Exemplary metals for which M is representative include aluminum, zinc, and the alkali metals, e.g., sodium, potassium, and lithium, as well as other electronegative metals. These electrodes will be applied by any method useful to those skilled in the art. For example, in forming a bipolar electrode wherein the electronegative metal is lithium, the fresh foil side of the module can be provided as a surgically cleaned nickel surface, whereby the lithium metal will be strongly adhering by its own affinity to the surface.

The following examples show ways in which the invention has been practiced but should not be construed as limiting the invention.

EXAMPLE 1

A generally rectangular support plate, of metallic nickel, is used; it measures $\frac{1}{8} \times 4 \times 12$ inches. A silver clad, imperforate nickel foil of 2 mils thickness and having a broad $3 \times 4$ inches face is prepared for plating by degreasing with acetone. The foil is placed against the support plate, nickel side facedown. Using masking tape, the edges of the foil are taped against the support plate, leaving a $2 \times 3$ inches exposed silver face. A carbon-containing polyurethane foam from the Scott Foam Subsidiary of GFI, and having a resistivity of about 70 ohm-cm, is placed against the silver clad side of the foil. The foam piece has dimensions of $0.125 \times 2 \times 3$ inches. This foam piece thereby fills the untaped exposed broad silver surface face of the foil. Around the edge of the foam, there are placed non-conductive polyvinyl chloride (PVC) shims having a thickness of less than the foam.

On top of the foam, there is placed a perforate PVC overlay plate having dimensions of $\frac{1}{8} \times 3 \times 4$ inches and containing 192 holes of $\frac{1}{8}$ in. diameter each. The plate is pressed firmly against the shims, thereby pressing against the foam and in turn pressing the foam against the foil. The perforate non conductive PVC plate in pressed condition is held in place by taping. A portion of the support plate removed from the foil-foam combination is connected to a means for supplying electric current to the plate. The resulting structure can then serve as one electrode in an eletroplating bath.

For serving in this function, the portion of the support bearing the foil-foam combination is immersed in a nickel electroplating bath. The bath contains 300 grams per liter of nickel chloride hexahydrate ($NiCl_2 \cdot 6H_2O$) 300 grams per liter of nickel sulfate hexahydrate ($NiSO_4 \cdot 6H_2O$) and 40 grams per liter of boric acid ($H_3BO_3$). The bath is at a pH of about 4. The bath is maintained at a temperature of about 60° C. and during electrolysis the current density is 30 asf (amperes per sguare foot). The electrolysis is continued for 39 minutes thereby depositing 1.095 grams of nickel on the foil-foam combination per ampere hour (AH). The electrode is removed from the bath, the PVC overlay plate removed from the foam, and the foil-foam combination rinsed with deionized water.

The PVC overlay is then replaced over the foam and retaped. This electrode is then immersed in an electroplating bath for electroplating metallic silver, which bath is an alkaline bath containing a potassium silver cyanide complex with proprietary additives. The bath is available from American Chemical and Refining Company and identified as solution ACR-25. Electroplating is conducted at room temperature and with a current density of 15 asf, for a time of 7 minutes. This provides a weight gain of silver for the foil-foam combination of 4.024 grams per AH. Following this electroplating, the electrode is removed from the electrolysis solution, the plastic overlay and PVC shims are removed and the resulting plated foil-foam combination is thoroughly rinsed in deionized water. Upon untaping of the foil edges from the support plate, the foil-foam combination is easily released from the plate.

The polyurethane underlying the metallized foam reticulate metal portion) of the foam-foil module is then removed by pyrolysis. This polyurethane removal is accomplished by placing the module in an oven and subjecting it to the following step-wise heat treatment schedule: 650° C. for two hours in a reducing atmosphere containing argon gas in admixture with 4 volume percent hydrogen; 454° C. for thiry minutes in air; and, overnight at 454° C. in the argon/hydrogen reducing atmosphere. After cooling, the original weight of 5.616 grams for the unpyrolyzed module is found to be reduced to 5.215 grams. The resulting reticulate metal portion of the module is then ready for loading with particulate silver.

The particulate silver employed has an average particle size of about 2.5 microns, a loose bulk density (Scott) of about 13 grams per cubic inch (g/in$^3$) and a tap density (Tap-Pak) of about 28 g/in$^3$. A 15 gram portion of the silver powder is added and spread into the reticulate, working the powder layer back and forth with a spatula under manually applied pressure. The resulting filled reticulate is then pressed at 3 kpsi to a thickness of 0.038–0.040 inch followed by sintering for a time of five minutes in the above identified argon/hydrogen reducing atmosphere at a temperature of 360° C. After the sintering, the module, now containing interbonded powdered silver particles in the reticulate portion of the module, is maintained in the furnace as the furnace is allowed to cool. A silver lead is attached to the foil portion of the module and the module immersed in a 30% solution of potassium hydroxide. At room temperature, the silver is converted to silver oxide by anodization for 108 hours at a current density of 15 ma/cm$^2$. Approximately a 30% overcharge above theoretical 100% oxidation for the silver to silver oxide is used. A 2.045 gram weight gain of oxygen is measured after the anodization. A 6.86 ampere hour (AH) equivalent is calculated as follows:

$$\frac{2.045 \text{ g}}{32 \text{ g/mol}} \times \frac{4 \text{ Faradays}}{\text{mol}} \times \frac{96500}{3600} = 6.86 \, AH$$

where 96500 are coulombs per Faraday and 3600 are seconds per hour. This represented a 91.5% efficient charge of the electrobonded silver powder, the charge efficiency being calculated as follows:

$$\frac{6.86}{7.5} \times 100 = 91.5\%$$

The finished module is judged to be highly serviceable for use as an electrode-intercell connector module in a bipolar electrode, which bipolar electrode could be readily completed by placing a suitable electronegative metal electrode element, e.g., a lithium electrode, on the side of the foil opposite from the silver oxide electrode.

EXAMPLE 2

A 304 stainless steel foil of 0.5 mil thickness and having a broad 3×4 inches face is prepared for plating by degreasing with acetone. The foil is placed against the metallic nickel support plate as described in Example 1. Using masking tape, the edges of the foil are taped against the nickel-support plate to leave a 2×3 inches exposed stainless steel face. The resulting structure can then serve as one electrode in an electroplating bath.

As such electrode, the structure is immersed in a Woods nickel strike bath containing 240 grams per liter of nickel chloride hexahydrate and 125 milliliters per liter of concentrated hydrochloric acid. The bath is electrolyzed, maintained at a temperature of about 25° C., and during electrolysis the current density is 20 asf. The electrolysis is continued for 25 minutes thereby depositing 1.095 grams of nickel per ampere hour at 100% current efficiency on the stainless steel foil. By visual inspection, the foil can be seen to be coated with the nickel electroplate.

In the manner of Example 1, a foam piece as described in Example 1 and having dimensions of 1/16×2×3 inches is placed over the nickel plated stainless steel foil. Also as is described in Example 1, the perforate PVC overlay is placed on the foam. This combination is structured as an electrode and then immersed in the Example 1 nickel electroplating bath. Electrolysis is conducted for 40 minutes at 20 asf, the bath being maintained at a temperature of about 60° C. This thereby deposits 1.095 grams of nickel per ampere hour at 100% current efficiency on the foil-foam combination. The electrode is removed from the bath, the PVC overlay is taken away, and the foil-foam combination is rinsed with deionized water. The nickel plated foam is seen to have desirable adhesion to the underlying plated foil.

This foil-foam combination is then electroplated with metallic silver and pyrolyzed in the manner of Example 1. Upon completion of the silver plating operation, the resulting article is judged to be highly suitable for use as a foil-foam module for further use, such as in the manner of Example 1, for preparing a silver oxide electrode/intercell connector module which can be employed in a bipolar electrode.

We claim:

1. The method of producing a unitized electrode-intercell connector module of a bipolar electrode of the M-alkaline electrolyte-AgO types wherein M represents a suitable electronegative metal, which method comprises:

contacting an imperforate metal foil intercell connector with a metal platable plastic foam having interconnected pores;

electroplating the resulting foil-foam combination, with the plating forming reticulate metal while intermetallically electrobonding said metal to said imperforate metal foil;

pyrolyzing the resulting unitized combination, thereby removing plastic foam underlying said reticulate metal plate;

establishing a silver active material in the interstices of said reticulate metal plate whereby said plate is loaded with silver filling; and sintering the silver of the loaded reticulate metal plate;

thereby forming said electrode-intercell connector module for a bipolar electrode.

2. The method of claim 1, wherein a metal foil having a metal selected from the group consisting of nickel, steel, stainless steel, copper, silver and alloys and intermetallic mixtures of same, is contacted with a foam having interconnected pores and containing a plastic selected from the group consisting of polyurethane, polyolefin, polyester, polyamide, vinyl polymers and their mixtures.

3. The method of claim 1, wherein said metal foil is contacted with a carbonized plastic foam.

4. The method of claim 1, wherein said foil-foam combination is plated with a metal selected from the group consisting of copper, nickel, silver, gold and their mixtures.

5. The method of claim 1, wherein said foil-foam combination is plated by nickel electroplating.

6. The method of claim 1, wherein said plating includes a succession of metal platings and the final plating is silver electroplating.

7. The method of claim 1, wherein said plating provides a discontinuous plate.

8. The method of claim 1, wherein pyrolyzing is conducted by heating in a step-wise manner at temperatures within the range from about 350° C. to about 700° C.

9. The method of claim 8, wherein the heating is conducted in a non-reducing atmosphere, a reducing atmosphere, or a sequence thereof during said step-wise progression.

10. The method of claim 1, wherein establishing a silver active material in the reticulate plate interstices includes loading the interstices with particulate silver.

11. The method of claim 10, wherein the loading of the reticulate metal plate is a loading with dry silver particulates.

12. The method of claim 10, wherein the loading of the reticulate metal plate is wet method loading.

13. The method of claim 10, wherein the establishing of silver active material in the reticulate plate interstices includes converting silver particulates to AgO.

14. The method of claim 13, wherein the silver of said particulates is converted to AgO by anodization.

15. The method of claim 1, wherein establishing a silver active material in the reticulate plate interstices includes impregnating same with silver salt solution and precipitating AgO from said solution.

16. The method of claim 1, wherein the sintering of the loaded reticulate is conducted at a temperature of below about 500° C. in a reducing atmosphere.

17. The method of claim 1, wherein an electronegative metal electrode is applied to said foil on the face opposite from the AgO electrode.

18. The method of claim 17, wherein the electronegative metal M of said electrode is selected from the group consisting of alkali metals, alkaline earth metals, zinc, aluminum and their mixtures.

19. The method of producing a unitized electrode-intercell connector module of a bipolar electrode, which method comprises:

contacting an imperforate metal foil intercell connector with a metal platable plastic foam having interconnected pores;

electroplating the resulting foil-foam combination with the plating forming reticulate metal while intermetallically electrobonding said metal to said imperforate metal foil; and processing the reticulate metal plate of the resulting unitized combination to an electrode; which processing includes;

filling the interstices of said reticulate metal plate with battery active material;

thereby forming said electrode-intercell connector module for a bipolar electrode.

20. The method of claim 19, wherein processing the reticulate metal plate includes pyrolyzing the resulting unitized combination to remove plastic foam underlying said reticulate metal plate.

21. The method of claim 19, wherein said foil-foam combination is plated with a metal selected from the group consisting of copper, nickel, cadmium, zinc, silver, gold and their mixtures.

22. The method of claim 19, wherein processing the reticulate metal plate includes filling the interstices of same with particulate silver.

23. The method of claim 19, wherein processing the reticulate metal plate includes impregnating same with silver salt solution and precipitating AgO from said solution.

24. The method of claim 19, wherein processing the reticulate metal plate includes sintering of said plate after filling the interstices thereof with battery active material.

25. The method of preparing an openly porous, reticulate metal plate structure from a reticulate metal plate precursor of filiform, open pore plastic foam underlayer and plated metal toplayer, which method reduces said precursor weight while enhancing resistance of said structure to chemical attack, said method comprising:

first heating said reticulate precursor at elevated temperature and for moderate time in reducing atmosphere;

establishing a non reducing atmosphere while lowering said temperature;

second heating the precursor residue from said first heating for a short time at said lower temperature and in said non reducing atmosphere; and continuing said heating at said lower temperature, while conducting same in a reducing atmosphere, with said heating continuing for a time exceeding the total of said first heating time plus said second heating time.

* * * * *